Feb. 24, 1970 R. R. NEWTON 3,497,807
MULTIPURPOSE SATELLITE SYSTEM
Filed Aug. 31, 1966 2 Sheets-Sheet 1

ROBERT R. NEWTON
INVENTOR

BY *J. O. Tresansky*
ATTORNEY

ROBERT R. NEWTON
INVENTOR

United States Patent Office 3,497,807
Patented Feb. 24, 1970

3,497,807
MULTIPURPOSE SATELLITE SYSTEM
Robert R. Newton, Silver Spring, Md., assignor to the United States of America as represented by the Secretary of the Navy
Filed Aug. 31, 1966, Ser. No. 576,801
Int. Cl. H04b 7/20, 7/14
U.S. Cl. 325—4      6 Claims The present invention relates to an improved satellite system employing low altitude satellites.

One object of the invention is to provide a satellite system which is capable of meeting simultaneously the requirements for navigation, communications and meteorology and which, with the addition of suitable observing apparatus, can be used for mapping the surface of the earth.

As another object the invention provides a non-synchronous satellite system wherein the satellites employed are easier to place in orbit than those of synchronous systems, because they are closer to the earth and can thus be smaller and can operate at lower power levels.

The invention, as a further object, a non-synchronous satellite system which, when used for navigation, will possess greater accuracy than any known method of navi- of using synchronous satellites.

Other objects and many of the attendant advantages of the present invention will be come apparent by reference to the following description when considered in connection with the accompanying drawings, wherein.

Figure 1:
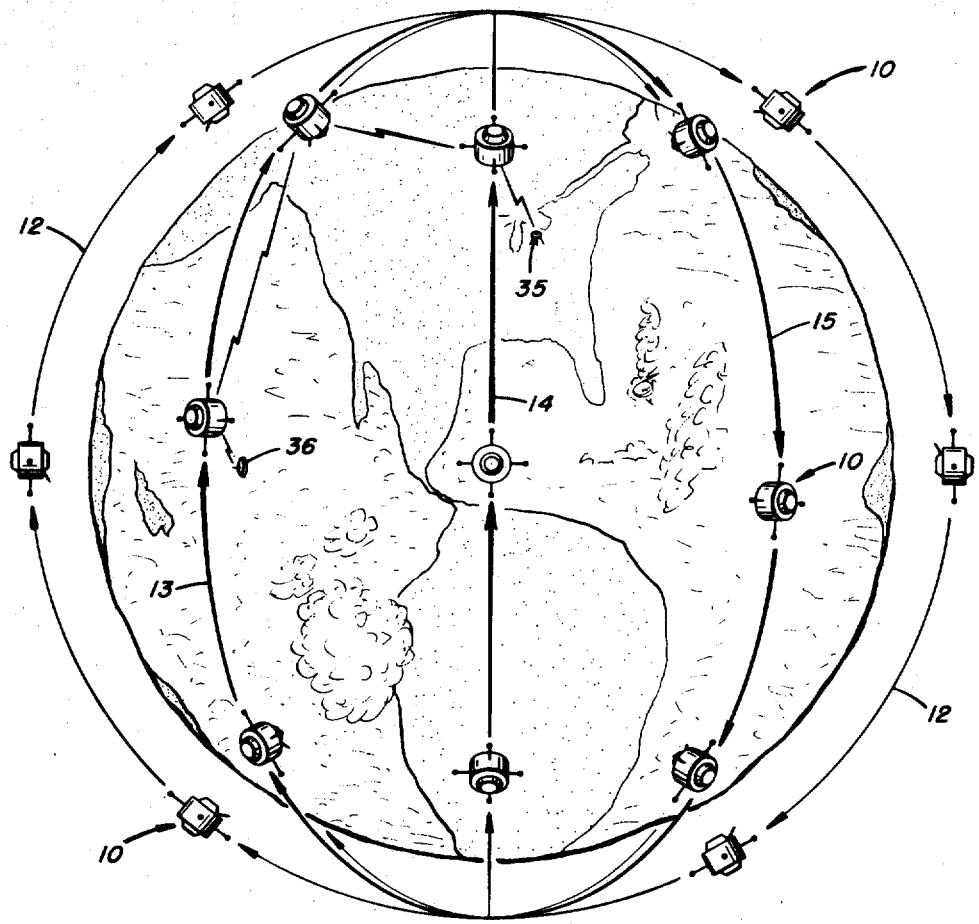
FIG. 1 is a pictorial representation illustrating the system of the present invention with satellites moving in each of four orbital planes.

The present invention provides a multi-purpose satellite system which employs relatively low altitude satellites, and which is capable of meeting simultaneously the requirements for navigation, communication and meteorology. By provision of appropriate observing apparatus the system of the present invention can also be used for mapping and other activities that involve observing the surface of the earth.

According to the system of the present invention, a number of satellites are placed in several different orbital planes with several satellites in each plane. The number of orbital planes chosen, the number of satellites in each plane, and the altitude of each satellite may be chosen after a study of the desired system has been made, and variations will not depart from the scope of this invention. In the drawings six satellites are shown in each of four orbital planes, the satellites being in circular polar orbits at an altitude of approximately 860 nautical miles. As will be obvious, the satellites will be placed in four orbital planes with angles of 45° between adjacent planes. For purposes of providing a clear understanding of the invention it will be assumed, as to each orbital plane, that the satellites are equally spaced thereabout, which spacing may be effected by known "station keeping" methods aboard the satellites, e.g., controlled jets. Another state-of-the-art method for station keeping contemplates the use of thermally controlled sublimation devices.

With the satellites arranged as described above, any point on the earth is always within the line of sight of some satellite and any satellite is always within the line of sight of an adjacent satellite in the same orbital plane.

The collection of all points on the earth's surface that are within line of sight of a particular satellite will be called the circle of coverage of that satellite. In the example chosen for illustration, the circle of coverage of a satellite contains all points within approximately 37°, measured along a great circle, from the point on the surface that lies directly beneath the satellites. In the same example, the six circles of coverage of the six satellites that lie in the same orbital plane include between them all points that lie within a belt that passes completely around the earth. The collection of all points that lie within at least one of these circles of coverage will be called the zone of coverage of the orbital plane. This zone is symmetrical about the orbitally plane, and it varies in width from approximately 45° to approximately 74° of arc of a great circle.

Every point on earth lies within one or more zones of coverage. A point near the Equator may lie within only one. A point within approximately 22½ degrees of either Pole lies within all zones of coverage.

When using the system for communication between a sending station and a receiving station on the surface of the earth, there are two possible situations. In the first situation, both the sending and receiving stations lie within the same zone of coverage. In the second situation, no zone of coverage contains both the sending and receiving stations. The operation of the system is different in some respects for the two situations.

In the first situation, the sending station transmits a message to the nearest satellite in an orbital plane whose zone of coverage contains both the sending and receiving stations. This satellite receives the message and immediately repeats it to an adjacent satellite lying in the same orbital plane, which adjacent satellite in turn repeats it to the next adjacent satellite in the same orbital plane, and so on as needed until the message reaches the satellite nearest the receiving station to which the message is directed. This satellite does not repeat the message through the transmitter that it would use for transmitting to an adjacent satellite, but instead switches the message to a second transmitter that transmits to the ground receiving station.

Each message originating from a ground station shall contain a coded section, hereinafter called the address. The purposes of this address are (a) to cause the correct satellite to transmit the message to the ground station rather than repeat it to an adjacent satellite and (b) to cause other satellites that may have been involved in the transmission of the message to repeat the message only to an adjacent satellite in the same orbital plane and not to a satellite in a different plane or to a ground station. There are many ways to design an address code. It performs a function similar to that of the area code in long distance telephony and can be designed in analogous ways. A simple example of an address code will be described in more detail hereinafter.

According to circumstances such as the total communication load being carried by the system and the relative locations of the sending and receiving ground stations, the address may also cause the satellite that receives the message from the sending station to repeat it only to a chosen one of the two adjacent satellites in the same orbital plane.

The fact that one satellite repeats the message to the ground instead of to an adjacent satellite prevents a message from being repeated indefinitely around the ring of satellites in the same plane. However there will be a small amount of stray power in each message transmission that will reach satellites for which the message is not intended and which will be repeated by them. This will produce noise in the communication system of an amount that cannot be determined accurately except by actual tests of the system. Noise of this type can be reduced by the use of directional transmitting and receiving antennas on the satellites. It can be further reduced by suitably using the Doppler shift in the transmissions between satellites. There is little relative velocity and hence little Doppler shift in the transmissions between satellites in the same orbital plane while there is a large Doppler shift between satellites in different planes at almost all points in their orbits. Therefore the repeating transmitter in each satellite can be designed so that it transmits a small amount of power in its unmodulated carrier frequency. It can further be designed to function only if its associated receiver receives a signal consisting of the carrier frequency with no more than a known amount of Doppler shift imposed thereon.

If further reduction of the noise produced by stray power proves by test to be necessary, this can be accomplished by turning off the repeating transmitter in one satellite in each orbital plane. This can be controlled by a suitably placed command station. Alternatively it can be controlled by a timer in each satellite. For example, this timer could turn off the transmitter during the time that the satellite is within a known distance of the South Pole.

If the satellites in the system employ three-axis attitude stabilization, two known axes of each satellite will always lie in the orbital plane. For the signal repeating process, therefore, the satellites will employ antennas which are positioned to aim at the adjacent satellites in the same plane and hence to point slightly below the horizontal in the orbital plane.

In the second situation, the receiving point on the earth does not lie within any zone of coverage that also contains the sending station. In this situation, satellites in two different orbital planes are involved in transmitting a message between the two points on the earth. The sending station transmits the message to a chosen satellite that is above its horizon; the plane in which this satellite lies is called herein the sending plane. The message is repeated, if necessary, to one or more satellites in the sending plane in the manner already described until it reaches a satellite in a chosen location in this plane. The address code already referred to causes said satellite not to repeat the message to an adjacent satellite in the sending plane but instead to transfer the message to a satellite in a plane, to be called the receiving plane, whose zone of coverage contains the destined receiving station on the earth. From the satellite in the receiving plane that first receives the message, the message is relayed if necessary, in the manner already described, to the satellite in the receiving plane that is closest to the receiving station on the earth. Finally, this satellite transmits the message to the station on the earth in the manner already described.

There are many possibilities for the locations of the satellites involved in transferring the message from the sending plane to the receiving plane, and all such possibilities come within the scope of this invention. In one possibility, transfer occurs between the satellites in their respective planes that are closest either to the North Pole or to the South Pole. In another possibility, transfer occurs between satellites in the respective planes that are nearest to the Equator. In this second possibility the satellites in the sending and receiving planes are not always within line of sight of each other. If they are not, the transfer will require the use of one or more satellites that are not in either the sending or receiving planes.

The choice of the method of transfer and of the satellites used in communicating between the two stations on the earth will be governed by the address code already referred to. For the sake of definiteness in the examples to be hereinafter described, it will be assumed that the transfer between orbital planes occurs between the satellites in the respective planes that are nearest to the North Pole.

It is to be noted that, at the time of transmission of the message from the originating station on the earth, the operator at said station knows which satellite in which orbital plane will first receive the message and that he also knows which satellite in which plane will ultimately send the message to the receiving station on the earth. This knowledge is involved in determining the address code.

The maximum delay time between transmission and receipt of the message can be made equal to the time required for light to travel once around the earth at the altitude of the satellites; this time is approximately one-sixth of a second. Except as limited by the power available, a limitation that is common to all communications systems, the system is available to users on a full-time basis.

If the satellites were allowed to assume random phases around their respective planes rather than being kept in a fixed spacing, there would be, of course, occasional gaps in coverage. Such gaps could be reduced by placing more satellites in each plane. The present state-of-the-art in "station keeping" is such, however, that fixed spacing would be the most feasible approach. Further, by suitable choice of the phases of satellites in different orbital planes, it is possible to use a lower altitude for the satellites, with consequent improvement in navigation accuracy.

Figure 2:
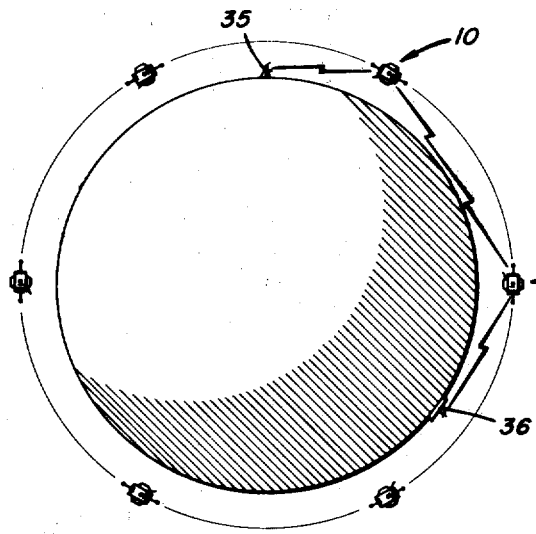
FIG. 2 is a diagrammatic view showing the manner of transmitting a message from one ground station to another, utilizing a pair of satellites moving in the same obital plane.

In the drawings, the system is shown in FIG. 1 with satellites 10 in each of four orbital planes, the planes being shown at 12, 13, 14 and 15. As best seen in FIG. 2, each orbital plane includes six equally spaced satellites, the spacing of the satellites in each orbital plane being accomplished by well-known means such as small rockets or sublimitation devices.

Figure 3:
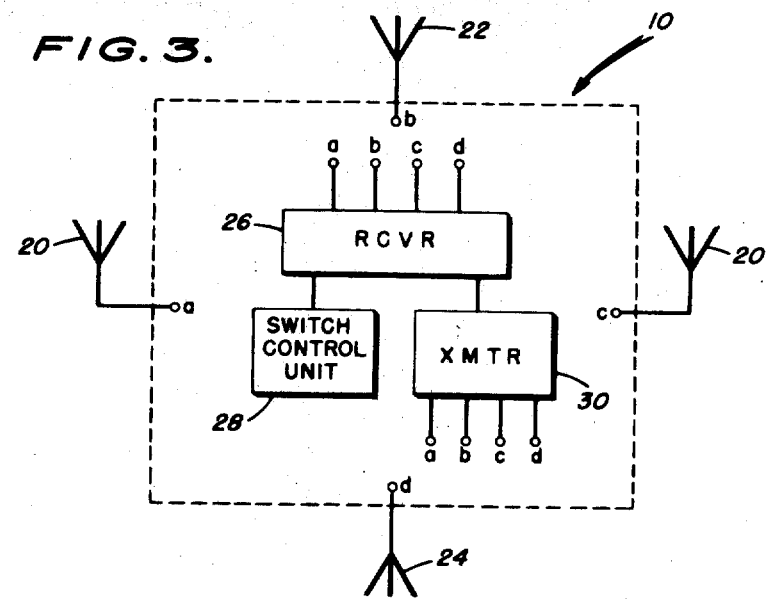
FIG. 3 is a block diagram showing the arrangement, within a satellite, of the major components that are used in communications.

In FIG. 3 there is shown a block diagram of the arrangement of components within a typical satellite, all satellites being arranged in the same manner. Accordingly, each satellite 10 includes a receiver 26, a transmitter 30, and an electronic switch control unit 28. Each satellite has four suitable antennas. The antennas 20 are used in communicating with the two adjacent satellites in the same orbital plane, antenna 24 is used in communicating with a ground station, and antenna 22 is used in the transfer of messages between satellites in different orbital planes. Because of different requirements, the different antennas, although of conventional design, are not identical. The antennas 20 are positioned for maximum reception from the similar antennas in adjacent satellites, and antenna 24 is positioned for maximum signal input from ground stations. Antenna 22 must be able to receive signals from any horizontal direction; it can be either a fixed antenna of suitable design or a steerable antenna, according to the detailed design of the system that results from considering detailed requirements.

The receiver 26 and the transmitter 30 can be connected with any of the antennas. The switches that perform the connections are controlled by the switch control unit 28, whose operations are governed by the address portion of a message. For simplicity in the figure, the switches and the wires connecting the receiver 26 and the transmitter 30 are not shown in detail. It is to be understood that the switch control can connect any of the points labelled $a$, $a$, $a$ with each other, and similarly for the points labelled with the letters $b$, $c$, and $d$.

It should be understood that the receiver, transmitter, and switch control unit are of conventional design, so that detailed descriptions and circuit diagrams of them are not believed to be needed. In particular, as will appear in more detail hereinafter, the required operations of the switch control unit 28 can be described in terms of a set of choices, with the choices depending upon binary integers appearing in the address code. The set of choices to be made is called the logic of the switch unit. Using well-known methods, a switch unit can be designed to correspond to any prescribed logic, and that in many different ways.

Referring again to FIG. 2, a ground station transmitter is shown diagrammatically at 35 and a ground receiving station at 36. Let it be assumed that the transmitter and receiver are located near satellites 10 in the same orbital plane. It should also be understood that by well-known means the operator of the transmitter 35 can be informed of the ephemerides of all the satellites in the system, and hence that he can determine the location of each satellite in the orbital plane nearest him. He will also know that the station 36 is in the zone of coverage of the same plane and he will know which satellite in that plane is nearest to said receiving station 36. Therefore the operator will send a signal to the nearest satellite and this signal will include an address code and a message. This signal will enter the antenna 24 and will pass through to the receiver 26. From the receiver 26 the entire signal, including the address, will enter the transmitter 30 to be repeated. The address code will also pass into the switch control unit 28 which will connect the transmitter to the proper antenna for repeating. A possible address code will be described subsequently herein.

It is to be understood throughout the rest of the description of the system that the switch control unit 28 disconnects the receiver 26 from any antenna to which it connects the transmitter 30. For brevity, only the connection of the transmitter will be mentioned in most of the remaining discussion.

For purposes of clarity, let it be assumed that the satellites 10 which are closest to the ground transmitter 35 and to the ground receiver 36 respectively are adjacent to each other as shown in FIG. 2. Accordingly, when the message is received in the first said satellite 10, its switch control unit 28 causes its transmitter 30 to be connected to that one of its antennas 20 that is directed toward the second said satellite 10. When the second said satellite receives the message including the address code, its switch control unit 28 connects its transmitter 30 to its antenna 24, through which the message is repeated to the ground station 36. If this second said satellite were not the proper one to repeat the message to the ground, its unit 28 would connect its transmitter 30 to that one of its antennas 20 that will transmit in the desired direction, as governed by the address code.

In FIG. 1 the ground transmitter 35 is shown near one orbital plane, i.e., the plane 14, whereas the receiving station 36 is located near the orbital plane 13. In this situation, the plane 14 is an example of the plane that was called the sending plane earlier herein and the plane 13 is an example of the plane that was earlier called the receiving plane. Still in the situation shown in FIG. 1, the address and message are sent to the satellite in plane 14 that is nearest the station 35. This satellite, since it happens to be also the satellite in plane 14 that is nearest the North Pole, uses its antenna 22 to repeat the address and message to the satellite in plane 13 that is nearest the North Pole. Said satellite in plane 13 repeats the message, using the appropriate one of its antennas 20, to the satellite in plane 13 that is nearest the ground station 36. Finally, this said satellite, using its antenna 24, repeats the message to the ground. All antennas used by the respective satellites in repeating the message are selected by the switch control unit in response to the address code. Additional repetitions of the message between adjacent satellites in either the sending or receiving planes may be needed for other possible locations of the ground stations 35 and 36.

Figure 4:
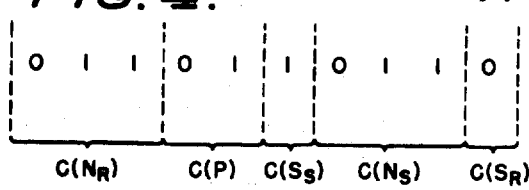
FIG. 4 illustrates the design of an address code that causes the satellite equipment to route a communications message to a destined ground receiving station.

The design of the address code follows well-known principles. The methods of design and use will be illustrated by an example that is adequate if the system is handling only one message at a time and if transfer of messages between orbital planes occurs near the North Pole where some satellite in each plane is within line of sight of some satellite in every other plane. The code used for illustration consists of a binary number of ten bits, divided into five fields, as shown in FIG. 4. The fields are divided by the dotted vertical lines.

In setting up the code, each satellite in a given orbital plane is assigned a code number from 0 through 6 in decimal notation, which is from 000 through 101 in binary notation. The first field of three bits in FIG. 4 is the code number of the satellite that will finally transmit the message to the ground receiving station 36. The binary number contained in this field will be called $C(N_R)$ herein.

Further, in setting up the code, each orbital plane is assigned a code number from 0 through 3 in decimal notation, which is from 00 through 11 in binary notation. The second field in FIG. 4, containing 2 bits is the code number of the plane whose zone of coverage contains the ground station 36. The binary number contained in this field will be called $C(P)$ herein.

Further, in setting up the code, it must be recalled that the originator of the message is to determine in which of the two possible directions a message is to be transmitted between adjacent satellites in the same orbital plane. The third field in FIG. 4, containing one bit, refers to this direction, with respect to the plane, earlier herein called the sending plane, that contains the satellite first receiving the message from the ground transmitting station 35. The binary number in this field, which will be either 0 or 1, will be called $C(S_s)$ herein.

In the situation that the ground stations 35 and 36 lie in the same zone of coverage, the three fields described above are sufficient, and the remaining two fields can be filled at random. If the ground stations 35 and 36 do not lie in the same zone of coverage, the remaining two fields of binary bits in FIG. 4 are needed. The fourth field in FIG. 4, containing three bits, is the code number of the satellite in the sending plane that is to transfer the message to the receiving plane. The binary number contained in this field will be called $C(N_s)$ herein. The fifth field in FIG. 4, containing one bit, designates the direction in which the message is to be transferred between adjacent satellites in the receiving plane, if such transfer is needed. The binary number contained in this field will be called $C(S_R)$ herein.

It is to be understood that the operator of the station 35 can calculate the numbers to be entered in all five fields in FIG. 4 from his knowledge of the ephemerides of all the satellites and of the location of the ground receiving station 36. The numbers shown for illustration in FIG. 4 correspond to the situation shown in FIG. 1, and the operation of the address code will be further described on the assumption that the satellite in the orbital plane 14 shown receiving the message from station 35 has the code number 011, that the satellite shown nearest the North Pole in the plane 13 has the code number 100, that the satellite nearest the ground station 36 in said plane 13 has the code number 011, that the orbital plane numbered 14 in FIG. 1 has the code number 10, and finally that the orbital plane numbered 13 in FIG. 1 has the code number 01.

The code number of each satellite, to be called $n$, and the code number of the plane to which each satellite is assigned, to be called $p$, are stored in the switch control unit 28 in each satellite. Using the numbers $n$ and $p$ and the contents of the address code already described, the switch control unit, following well known principles, performs the switching operations that correspond to the following conditions:

(a) If $C(N_R)=n$ and if $C(P)=p$, the message has arrived at the correct satellite in the correct plane that can transmit to the receiving station 36. Therefore the transmitter 30 is connected to the antenna 24 for transmission to the ground.

(b) If $C(P)=p$ while $C(N_R)\neq n$, the message is in the correct orbital plane for transmission to the ground but not in the correct satellite in that plane. Therefore the transmitter 30 is connected to that one of the antennas 20 that corresponds to the direction designated by $C(S_S)$. This action sends the message to a different satellite for which $C(P)=P$ still but for which $n$ is changed by 1. Ultimately, by repetition of this process if necessary, the message arrives at the satellite for which $C(P)=p$ and $C(N_R)=n$; this satellite will transmit to the ground in accordance with $a$ above.

(c) If $C(P)\neq p$, the message is not yet in the receiving plane. In this case, $n$ is to be compared with $C(N_S)$ rather than with $C(N_R)$. If $n=C(N_S)$, the message is in the correct satellite for transfer to the receiving plane so that the transmitter 30 is connected to the antenna 22. If $$n\neq C(N_S)$$

the transmitter 30 is connected to that one of the antennas 20 that corresponds to the direction designated by $C(S_S)$. Repetition of this process, if needed, will finally bring the message to that satellite for which $C(N_S)=n$, whence transfer occurs.

(d) The switch control unit 28 must be able to distinguish a message received through antenna 22 from a message received through any other antenna. When a message is received on antenna 22, which message has therefore been received from a different orbital plane, the unit 28 compares $C(P)$ with its own value of $p$. If $C(P)\neq p$, the satellite is not in the destined receiving plane and the satellite does not connect the transmitter to any antenna. If $C(P)=p$, the message is in the receiving plane, and the switch control unit 28 replaces $C(S_S)$ by $C(S_R)$ before taking any other action.

(e) After this action, a message received through the antenna 22 is now in the correct plane for ultimate transmission to the ground, although it may not yet be in the correct satellite in that plane. Further $C(S_S)$ now contains the correct direction for forwarding the message to the satellite nearest the ground receiver 36. Since $C(P)=p$ now, either paragraph (a) or paragraph (b) above applies.

The operation of the address code will now be traced out for the situation shown in FIG. 1 for which the address shown in FIG. 4 applies. The message is first received by the satellite in orbital plane 14 that is nearest the ground transmitter 35. For the illustration, this satellite has been assigned the code number 011 and this plane has been assigned the number 10. That is, $n=011$ and $p=10$ for the satellite first receiving the message. Since $C(P)=01\neq p$, paragraph $c$ applies. Since $C(N_S)=011=n$, the transmitter in this satellite is connected to antenna 22 for transfer to another orbital plane. Since no transmission to an adjacent satellite in the sending plane was required before transfer to another plane, in this example, the value of $C(S_S)$ is not used and this field in FIG. 4 can be filled at random; in FIG. 4, the field containing $C(S_S)$ is shown filled with 1.

The message transmitted from the antenna 22 of the first satellite may be received by the satellites near the North Pole in each of the planes numbered 12, 13, and 15 in FIG. 1. For the satellites in planes 12 and 15, $C(P)\neq p$, so that these satellites do not repeat the message. For the satellite nearest the North Pole in plane 13, which said satellite has been assigned the code number 100 and which said plane has been assigned the code number 01, $C(P)=p$ and the first action is to replace $C(S_S)$, which originated as 1, by the value of $C(S_R)$ which is 0. This value 0 is to be understood as the value that causes transmission in the direction toward the ground receiver 36.

In the satellite that first received the message after the transfer, $p=01=C(P)$ while $n=100\neq C(N_R)$. Thus paragraph (b) of the operations of the unit 28 applies, and the transmitter is connected to that one of the antennas 20 that corresponds to the present value of $C(S_S)$, namely 0. By this action, the message is received in the satellite nearest the ground station 36. For this satellite, $$p=01=C(P)$$

and $n=011=C(N_R)$, so that paragraph (a) applies. Thus the transmitter in this last said satellite is connected to its antenna 24 and the message is transmitted to the ground.

To diminish feedback from the transmitter in any satellite to its own receiver, it is desirable to have different carrier frequencies associated with each of the four antennas in a given satellite. This will also diminish the reception of a message through an antenna other than the intended one. For example, it will prevent a message being transferred from another orbit, which should enter only through the antenna 22, from entering also through one of the antennas 20. Thus receiver 26 and the transmitter 30, which are each shown as single components in FIG. 3, will consist of four separate units each, with each unit being tuned to different carrier frequencies all in the ultra-high frequency range. Additional isolation of the receiver from the transmitter can be provided, if experience with the system proves this to be needed, by disconnecting the receiver from all antennas during the period of any transmission, rather than disconnecting it only from the transmitting antenna.

It is understood that the receiver 26 is connected to all antennas when the satellite is not handling any message but is only waiting.

In communication use, the system will probably be called upon to handle many different messages simultaneously. The problems associated with simultaneous users of a communications system are well-known and can be solved in well-known ways, such as by time or frequency sharing.

It is believed that the operation of the system as used for communication will be understood from the foregoing. However, it is desired to discuss briefly the use of the system for Doppler navigation. In Doppler navigation, two frequencies in the ultra-high frequency range are transmitted from a satellite toward the ground. In this system, these frequencies will be transmitted from each satellite 10 through its antenna 24 or alternately through this antenna and another antenna not shown. One of these frequencies can be the carrier frequency used for communications, without either the navigation or the communication usage interfering with the other, by suitable design of the modulation method.

One feature of the system as used for navigation is that continuous fixing of position will be possible, instead of having fixes available only about every two hours as in prior systems. Further, in prior systems, any error in the navigator's knowledge of his velocity produces an error in his position fix. In this system, with continuous fixing, this error is largely eliminated. In fact, the navigator will be able to make continuous measurements of his velocity as well as of his position.

It is to be understood that any possible method of navigation using satellites, and not just the Doppler method, can be used in conjunction with the satellites in the present system. For brevity, no other method of navigation will be described. It should also be understood that the present system can provide traffic control as well as position fixing. To use the system for traffic control, the navigator transmits his position, in the form of a communications message, to a central control point which returns instructions for action by the navigator. Further, if desired, the navigator can transmit the raw data for navigation to a central computing center, thus relieving himself of the need to perform the computations.

Although not shown in FIG. 3, each satellite may contain means for automatically reporting its position at any time, if desired. Moreover, a message can be sent through the system from any satellite to any point on earth, as previously described, so that it follows that a message can be sent in the opposite direction, i.e., from any point on earth to any satellite. Therefore, injection of a navigation message (that is, a message which reports satellite position) into the satellite memory is no longer restricted to the times when the satellite is facing the injection station. The injection station can transmit a navigation message for any satellite into the satellite which is nearest to it with appropriate instructions in the address to pass the navigation message on to the correct satellite. This means that an injection station can therefore inject into any satellite at such time that may be most convenient to the operator. As will be obvious, there will no longer be a need for each satellite to contain a large memory for storing a navigation message.

Figure 5:
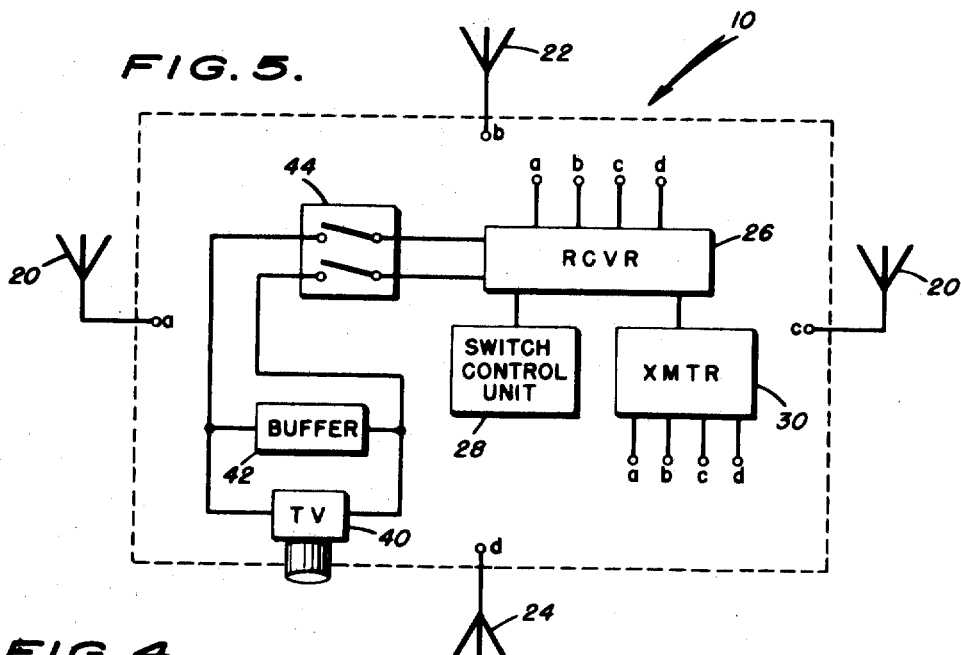
FIG. 5 is a block diagram of a satellite according to a modification of the invention, including a television system for meteorological studies or for earth surface mapping.

The system of the present invention may also be used for meteorological purposes by the addition of suitable apparatus, which is shown schematically in FIG. 5. To understand one method of operation for meteorological purposes, suppose that the ground station numbered 35 in FIG. 1 is a meteorological data center, and further suppose that the operator of this center wants a weather picture from the area around the station numbered 36 in FIG. 1, 36 in this use is not a ground receiving station but simply denotes an area from which meteorological data are desired.

To obtain a picture from the area 36, the operator of the station 35 sends a message in the manner already described. This message consists of three portions. The first portion is the address of the area 36, as already described and illustrated in FIG. 4. The second portion is a code which indicates that the message is not to be sent to the ground and which simultaneously is a command to take and transmit a picture. The third portion is the operator's own address code, designed by the principles already described. This message is sent through the system until it reaches the satellite over area 36. The switch control unit 28 in this satellite, in response to the second portion of the message (and thereby the design of the unit 28 is modified from the earlier description in well-known ways), does not cause the message to be transmitted to the ground. Instead, it causes the switch 44 in FIG. 5 to be closed. The command to operate passes from the receiver 26 to the television camera 40, suitably designed for meteorological pictures, and simultaneously the return address of station 35 passes from the receiver 26 into the buffer 42, where it is held momentarily. When the camera 40 is ready to start transmitting the picture, the address transfers back out of the buffer 42 into the receiver 26, being followed into the receiver by the contents of the picture. The receiver handles the address and picture as it would a signal received through one of the antennas. From this point on, the message is transmitted back to the station 35 in the manner already described for communications messages. When the camera has completed its picture, the switch 44 opens. The camera, buffer, and switch are all of conventional design, so that detailed descriptions of them are not believed to be necessary. It is to be understood that the camera 40 includes means for imposing the modulation carrying the picture information upon the appropriate carrier radio frequency.

If the camera 40 takes a picture which includes points lying 22½ degrees of arc on the earth from the orbital plane, every point on earth can be observed at time intervals of about 20 minutes. To obtain this coverage, it is necessary that the satellites be at such an altitude that the angle of the picture at this distance from the orbital plane gives acceptable pictures. The coverage is least frequent at the Equator and is highest near the Poles, which are under the planes of all satellites.

Use of this system for meteorology has advantages over systems using higher altitude satellites. Because of the low altitude, the optical systems in the camera can be of simpler and lighter design. Also, because of the low altitude, the accuracy of knowledge of satellite attitude does not need to be so high, again leading to simpler equipment. The launching vehicles which place the satellites in orbit can be smaller, both because the satellites are smaller and because they do not need to be carried to high altitude. Thus it is believed that the present system can be established at lower cost than a system giving equivalent coverage and performance at higher altitudes, even though fewer satellites are needed at higher altitudes.

It is clear that the user of the system can arrange to have a global weather picture every 20 minutes if he wishes, either by sending the appropriate sequence of commands or by connecting timers to the cameras. Alternately, he can focus his attention upon a particular portion of the earth, such as the arctic regions.

The system of the present invention can also be extended to include mapping or other activities that involve observing the surface of the earth, by including suitable equipment. In the case of mapping or other activity which involves pictorial operations, the equipment would be similar to that shown schematically in FIG. 5, with the detailed optical and electronic characteristics of the camera 40 being chosen according to the purpose. As is the case with meteorological uses, no data storage is required and observation need be made only at points of interest. For example, since meteorological data at the point of interest are immediately available, it can be determined whether there is a cloud cover. Accordingly, a satellite can be commanded to make its observations at only optimum times. As in the case of use of the system for meteorology, optical and other problems are common to any satellite system with the same purpose, but with the requirements eased by the low altitude and the possibility of instant and constant command and instant data flow.

Obviously, many modifications and variations of the present invention are possible in the light of the above teachings. It is therefore to be understood that within the scope of the appended claims the invention may be practiced otherwise than as specifically described.

What is claimed is:
1. A satellite system comprising:
 a group of orbiting satellites arranged in a plurality of orbital planes about the earth, there being a plurality of satellites in each of said orbital planes, and said orbital planes intersecting above the earth near the North and South Poles thereof,
 the satellites being so spaced in said planes that any point on earth is within line of sight of at least one of said satellites and one of said satellites is within line of sight of at least one other satellite in the same orbital plane and at least one of said satellites in any one of said planes is in line of sight of at least one of said satellites in an adjacent plane,
 a source of radial signals on the ground,
 a source of radio signals in each of the satellites,
 receiver means in each of said satellites for receiving a radio signal from one of said sources, and
 transmitter means in each of the satellites for transmitting a received radio signal to the ground or another satellite,
 the orbital planes being equally spaced from each other and the satellites in each said plane being equally spaced from each other and traveling in the same direction.

2. A satellite system as recited in claim 1, including additionally:
 means for switching a radio signal from a satellite in one orbital plane to a satellite in a different orbital plane as said satellites travel in adjacent planes and are at points distant from the point of intersection,
 said switching means comprising an electronic switch control unit responsive to a binary coded address in said radio signal.

3. A satellite system as recited in claim 1, including additionally:
   means for switching a radio signal from a satellite in one orbital plane to a satellite in a different orbital plane as said satellites approach the intersection of said planes or as said satellites travel in adjacent planes and are at points distant from the point of intersection.

4. A satellite system as recited in claim 1, wherein:
   said first-mentioned means comprises a plurality of antennas on the satellite and a receiver in the satellite and connected to said antennas, and
   said second-mentioned means comprises a transmitter and a plurality of antennas, any one of said antennas being connectable to said transmitter.

5. A satellite system as recited in claim 4, including additionally:
   means connected between the transmitter and said antennas and operable for switching the radio signal to one or the other of the antennas for transmission thereby to a satellite in the same or a different orbital plane or to a point remote from all of said satellites.

6. A satellite system as recited in claim 4, including additionally
   a television camera in each satellite for taking pictures, said camera having a radio frequency output,
   means connected between the television camera and the receiver for connecting said camera to said receiver upon command, whereby said receiver will process a picture from said camera in the same way as a signal from an antenna.

References Cited

UNITED STATES PATENTS

| | | | |
|---|---|---|---|
| 3,095,538 | 6/1963 | Silberstein | 343—100 X |
| 3,192,476 | 6/1965 | Nuffer et al. | 325—115 X |
| 3,243,706 | 3/1966 | Grisham | 325—15 |
| 3,271,511 | 9/1966 | Valonsi | 325—4 X |

OTHER REFERENCES

Electronic Age, vol. 19, No. 2, Weather Eye in the Sky; (pp. 2, 6 and 7 relied on).

Proceedings of the IRE; March 1959; pp. 372–380.

Pierce et al.; Transoceanic Communication by means of Satellites.

ROBERT L. GRIFFIN, Primary Examiner

B. V. SAFOUREK, Assistant Examiner

U.S. Cl. X.R.

325—113, 115; 343—100